Dec. 26, 1950     C. H. BILLMAN     2,535,888
FEEDER FOR MOLTEN THERMOPLASTIC MATERIALS
Filed Dec. 12, 1947
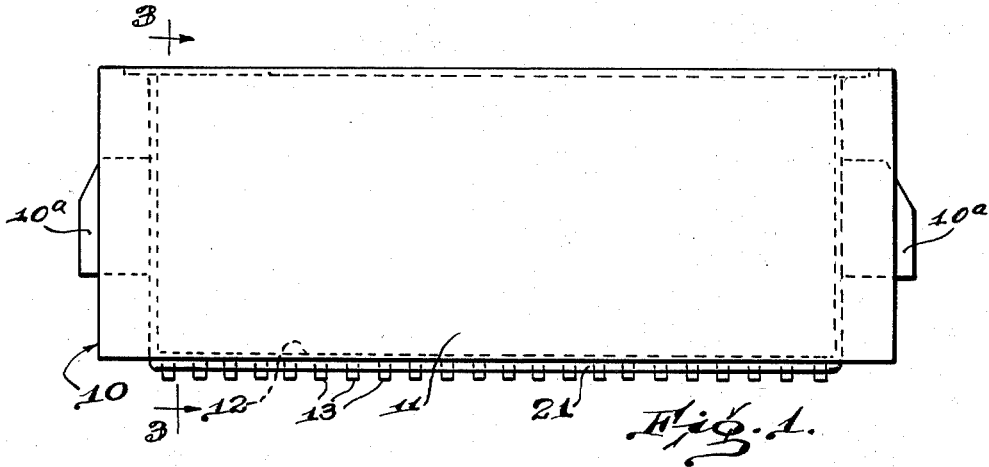
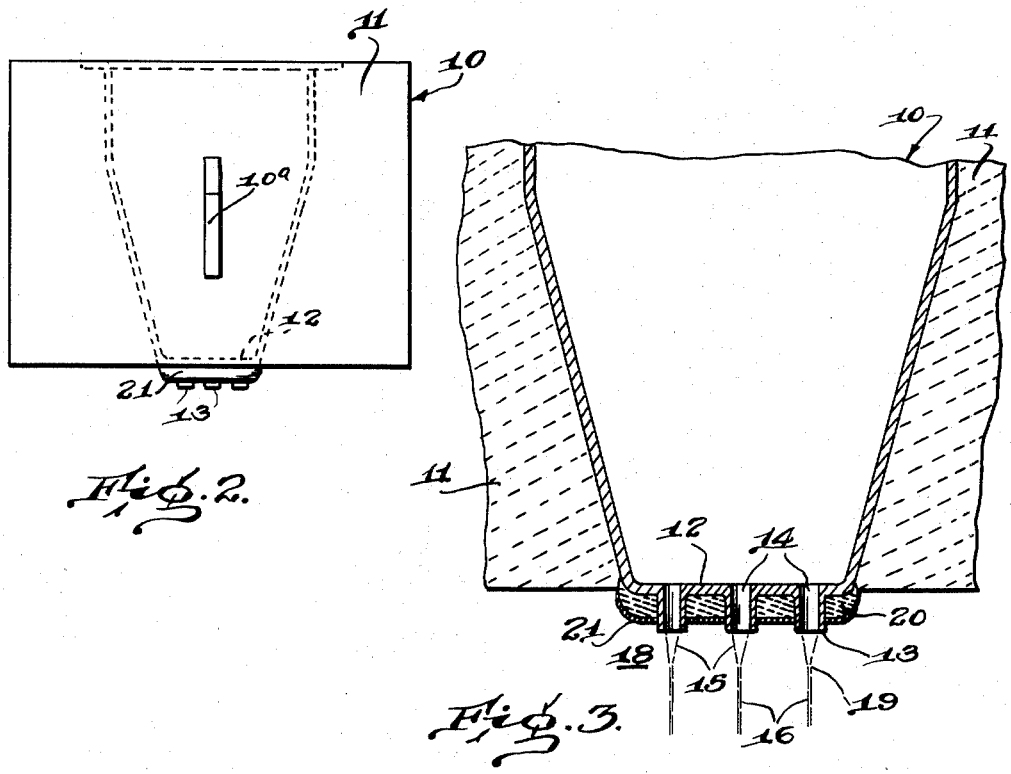
INVENTOR.
Charles H. Billman
BY
Staelin & Overman
ATTORNEYS Patented Dec. 26, 1950

2,535,888

UNITED STATES PATENT OFFICE 2,535,888

FEEDER FOR MOLTEN THERMOPLASTIC MATERIALS

Charles H. Billman, Newark, Ohio, assignor to Owens-Corning Fiberglas Corporation, a corporation of Delaware Application December 12, 1947, Serial No. 791,411

7 Claims. (Cl. 49—55)

This invention relates generally to the production of fibers from glass or other thermoplastic or heat softenable materials such, for example, as synthetic resins and refers more particularly to an improved feeder for such materials.

In the manufacture of fibers from glass or similar heat softenable materials, it is customary to melt glass stock in a feeder having a multiplicity of tips projecting downwardly from the bottom wall thereof and having bores through the tips forming orifices through which molten glass flows by gravity in the form of streams. In the event fibers of substantially continuous length are desired, the streams are attenuated to form fibers and the latter are collected in package form on a suitable rotating drum. In practicing the latter method attenuation is usually accomplished by the collecting drum and the latter is rotated at a substantially constant rate with a view to attenuating the fibers at an approximately uniform linear speed determined to a large extent by the fiber diameter desired.

It would appear that, since the rate of attenuation is substantially constant, the diameter of the resulting fibers would be uniform or, in other words, that the number of yards per pound of fibers formed would always be within relatively narrow limits. However, in actual practice, this has been difficult to achieve and, other things being equal, much of this difficulty is due to the wide variations in temperature in the fiber forming zone immediately in proximity to the discharge ends of the tips. In this connection, it is pointed out that as the streams of molten material or glass issue from the tips into the atmosphere below the feeder the glass in the streams partially solidifies and the fibers are attenuated from the streams at points spaced somewhat below the tips. It is conducive to obtaining fibers of uniform diameter that the fibers be drawn from approximately the same point below the tips throughout the operation and this is ordinarily very difficult to achieve due to the fact that the temperature of the zone immediately below the bottom wall of the feeder is subject to rapid temperature changes.

The variable temperature conditions normally existing below the feeder is due largely to the currents of air circulating past the bottom wall of the feeder in combination with the heat radiating downwardly from the tips and bottom wall of the feeder. Under normal operating circumstances the downward movement of the fibers as they are attenuated produce a substantial downdraft of air which carries heat from the bushing wall and tips and thus lengthens unnecessarily the fiber cooling zone. When considering that the feeder is usually heated electrically and is formed of an electrical conducting metal having high heat resisting characteristics, it will be understood that considerable heat is radiated from the bottom wall of the feeder.

With the above in view, it is one of the objects of this invention to overcome the above difficulties by a very simple alteration of the feeder construction which resists heat radiation from the bottom wall of the feeder and tips in the direction of flow of the molten glass. Thus, the zone immediately adjacent the discharge ends of the tips is maintained relatively cool and the circulation of air currents does not appreciably affect the point from which the fibers are attenuated.

Another object of this invention is to provide a feeder having a heat resisting covering for the outer surface of the bottom wall thereof and having a coating on the covering characterized in that it resists wetting of the covering by the molten glass issuing from the discharge orifices.

A further object of this invention is to provide a feeder construction of the above type wherein the tips as well as the outer surface of the bottom feeder wall are covered with a sillimanite cement and wherein a coating of water soluble chromic oxide is applied to the cement to resist wetting of the latter by the molten glass.

The foregoing as well as other objects will be made more apparent as this description proceeds, especially when considered in connection with the accompanying drawing, wherein:

Figure 1 is a side elevational view of a feeder constructed in accordance with this invention;

Figure 2 is an end elevational view of the feeder; and

Figure 3 is an enlarged cross sectional view through the feeder taken along the line 3—3 of Figure 1.

The feeder is indicated generally by the reference numeral 10 in the several figures of the drawing and is in the form of a receptacle adapted to contain a supply of molten glass or other heat softenable material from which fibers may be produced. The top wall as well as the side walls of the feeder are insulated by a suitable high heat resisting refractory material 11 and provision is made to supply glass stock to the interior of the feeder through the top wall of the latter. The means provided for supplying glass stock to the feeder forms no part of this invention and in the interests of simplicity is not shown herein.

In the present instance the feeder is heated electrically to a temperature sufficient to melt the glass stock to provide a supply of molten glass having the specified viscosity and accordingly the feeder walls are formed of a metal which not only possesses electrical conducting characteristics but, in addition, is capable of withstanding considerably high temperatures. The feeder 10 is provided with terminals 10a for connection in a suitable heating circuit. In the majority of cases platinum is used although nickel and molybdenum have been found satisfactory under certain conditions.

In any case, the bottom wall 12 of the feeder is formed with a plurality of downwardly extending tips 13 having bores therethrough forming orifices 14 through which molten glass flows by the action of gravity in the form of streams 15. As the streams are discharged into the atmosphere the molten glass is partially solidified and fibers 16 are drawn from the streams by suitable attenuating apparatus not shown herein. Regardless of the apparatus used for attenuating the streams to form the fibers, the rate of attenuation is substantially constant so that the resulting fibers will be more or less uniform in diameter.

However, attenuation of the fibers at a constant rate does not necessarily mean that the number of yards of fibers formed will always be within well defined limits because other factors also effect fiber uniformity. One of these factors is the wide variation of temperature in the fiber forming zone 18 immediately below the bottom wall of the feeder and caused primarily by the heat normally radiating downwardly from the bottom wall 12 as well as the tips 13. This radiated heat in conjunction with the air currents circulating through the fiber forming zone has a tendency to constantly alter the location of the points in the streams from which the fibers are drawn and not only detrimentally affects uniformity of the fibers but also is instrumental in causing fiber breakage. Non-uniformity of fiber diameter is highly objectionable in the manufacture of certain products from the fibers and fiber breakage causes interruptions in the forming process which are costly.

In accordance with this invention the above objections are largely overcome by resisting radiation of heat from both the bottom wall 12 and tips 13 in the direction of flow of the glass streams or into the fiber forming zone 18. Thus, the fiber forming zone is maintained relatively cool throughout the operation and the points 19 in the streams 15 from which the fibers are drawn remain uniformly close to the bottom wall of the feeder. The foregoing is accomplished by applying a coating 20 of high heat resistant refractory material to the outer surface of the bottom wall 12 and to the outer sides of the tips 13. Particularly satisfactory results have been obtained by using sillimanite or some equivalent cement as a refractory. Regardless of the specific nature of the refractory employed, it is preferred to coat the latter with a layer 21 of a material which resists wetting by the molten glass issuing from the tips. A water soluble chromic oxide has been found suitable for use as a non-wetting agent.

In actual practice fibers of uniform diameter have been produced with a minimum amount of breakage by resorting to a feeder construction wherein the combined thickness of the refractory 20 and the thin coating of the non-wetting agent 21 approximated three-sixteenths of an inch in cases where the tip length is substantially one-quarter of an inch. This specific arrangement provides sufficient heat insulation to reduce heat radiation to a minimum and permits the tips 13 to project at least one-sixteenth of an inch below the bottom surface of the refractory 20. This one-sixteenth inch projection of the tips is sufficient to prevent flow of the molten glass across the refractory from one tip to an adjacent tip especially in cases where the non-wetting agent 21 is employed. It will, of course, be understood that the foregoing installation is merely noted for the purpose of illustration and reasonably satisfactory results may be obtained by altering the dimensions specified.

I claim:

1. A container for supplying molten glass in the form of streams to be attenuated to fine fibers, said container having walls formed of a metal having high heat resisting and radiating characteristics, said container provided in its bottom wall with a multiplicity of discharge orifices through which molten glass flows, means for heating the container, a coating at least three-sixteenths of an inch thick of sillimanite cement on the bottom surface around the orifices for resisting radiation of heat from said bottom wall in the direction of flow of the glass streams issuing from the orifices, and a water soluble chromic oxide coating for the cement to resist wetting of the latter by the molten glass.

2. A rectangular container for molten glass formed of a metal having high heat resisting and radiating characteristics, said container having a flat bottom wall provided with a series of tips projecting downwardly from the bottom wall and each tip having a bore therethrough forming an orifice through which molten glass flows in the form of a stream, means for electrically heating the container, and a heat insulating refractory material covering the outer surface of the bottom wall between the tips and having a thickness somewhat less than the length of the tips.

3. A rectangular metal walled feeder adapted to contain a supply of molten glass, said metal having high heat resisting and radiating characteristics, said feeder having a flat bottom wall provided with a series of tips projecting downwardly from the bottom wall at least one-quarter of an inch and each tip having a bore therethrough forming an orifice through which molten glass flows in the form of a fine stream to be attenuated to a fiber, and a coating of heat insulating refractory material somewhat less than one-quarter of an inch in thickness applied to the outer surface of said bottom wall.

4. A rectangular metal walled feeder adapted to contain a supply of molten glass, said metal having high heat resisting and radiating characteristics, said feeder having a flat bottom wall provided with a series of closely spaced tips projecting downwardly from the bottom wall and each tip having a bore therethrough forming an orifice through which molten glass flows in the form of a fine stream, a heat insulating refractory material covering the outer surface of the bottom wall and the outer surfaces of the tips for reducing radiation of heat from said bottom wall, and a coating painted over the refractory material which resists wetting by the molten glass.

5. A rectangular metal walled container for molten glass, said metal having high heat resisting and radiating characteristics, means for heating the container, said container having a flat bottom wall provided with a series of closely spaced tips projecting downwardly from the bottom wall and each tip having a bore therethrough forming an orifice through which molten glass flows in the form of a thin stream to be attenuated to a fine fiber, a coating of sillimanite cement covering the outer surface of the bottom wall and the outer surfaces of the tips to inhibit radiation from said surfaces, and a water soluble chromic oxide coating for the outer surface of the cement to resist wetting of the latter by the molten glass issuing from the orifices.

6. In an apparatus for forming glass fibers, a container for supplying molten glass in the form of streams to be attenuated to fine fibers, said container including substantially rectangularly shaped walls of sheet metal and having a bottom wall provided with a plurality of closely spaced downwardly projecting tips having orifices therethrough, means for electrically heating said container, said metal normally radiating heat at a rapid rate, and a coating of insulating cement applied to said bottom wall surface and around said tips to reduce and prevent heat radiating from said surface from being drawn toward the streams by the down-draft of air resulting from attenuating the streams to fibers.

7. In an apparatus for forming glass fibers, a container for supplying molten glass in the form of streams to be attenuated to fine fibers, said container including substantially rectangularly shaped walls of sheet metal and having a bottom wall provided with a plurality of closely spaced downwardly projecting tips having orifices therethrough, means for electrically heating said container, said metal normally radiating heat at a rapid rate, a coating of insulating cement having a thickness less than the length of said tips applied to said bottom wall surface and around said tips to reduce and prevent heat radiating from said surface from being drawn toward the streams by the down-draft of air resulting from attenuating the streams to fibers, and a film of a water-soluble chromic oxide painted over said insulating cement.

CHARLES H. BILLMAN.

REFERENCES CITED

The following references are of record in the file of this patent:

UNITED STATES PATENTS

| Number | Name | Date |
|---|---|---|
| 2,011,489 | Kraner et al. | Aug. 13, 1935 |
| 2,031,083 | Weller | Feb. 18, 1936 |
| 2,106,527 | Hostetter | Jan. 25, 1938 |
| 2,251,130 | Haux | July 29, 1941 |